United States Patent [19]

Crivello et al.

[11] Patent Number: 5,412,054
[45] Date of Patent: May 2, 1995

[54] COBALT CATALYST FOR RING-OPENING POLYMERIZATION OF EXOPIDES AND OTHER HETEROCYCLES

[75] Inventors: James V. Crivello, Clifton Park; Ming-Xin Fan, Troy, both of N.Y.

[73] Assignee: General Electric Company, Waterford, N.Y.

[21] Appl. No.: 159,760

[22] Filed: Nov. 30, 1993

Related U.S. Application Data

[63] Continuation of Ser. No. 934,584, Aug. 24, 1992, abandoned.

[51] Int. Cl.$^6$ .................... C08G 65/10; C08G 65/02
[52] U.S. Cl. .......................... 528/15; 528/27; 528/31; 528/92; 528/357; 528/412; 528/423; 528/424
[58] Field of Search ............. 528/15, 31, 27, 92, 528/357, 412, 423, 424

[56] References Cited

U.S. PATENT DOCUMENTS

| | | | |
|---|---|---|---|
| 3,657,159 | 4/1972 | Vandenberg | 528/92 |
| 4,246,161 | 1/1981 | Smith et al. | 528/92 |
| 5,128,431 | 7/1992 | Riding et al. | 528/15 |
| 5,247,044 | 9/1993 | Crivello et al. | 528/15 |
| 5,260,399 | 11/1993 | Crivello et al. | 528/15 |
| 5,272,233 | 12/1993 | Crivello et al. | 526/279 |

FOREIGN PATENT DOCUMENTS

2241916 10/1987 Japan.

OTHER PUBLICATIONS

Crivello et al. *Catalysis of Ring Opening and Vinyl Polymerization by Dicobaltocarbonyl.* Journal of Polymer Science, vol. 30, 31–39 (1992). pp. 31–39.
*Group IV–Cobalt Complexes as Catalysts for Silylation and Cyclic Ether Polymerization.* Chalk Chemical Communications, 1970 pp. 847–848.
Wender, Levine and Orchin, J. Am. Chem. Soc., 1950, 72, 4375.
Wender, Sternberg and Orchin, J. Am. Chem. Soc., 1953, 75, 3041.
Orchin, Kirch and Goldfarb, J. Am. Chem. Soc., 1956, 78, 5450.
Harrod and Chalk, J. Am. Chem. Soc., 1965, 87, 1133.
Chalk and Harrod, J. Am. Chem. Soc., 1967, 89, 1640.
Baay and MacDiarmid, Inorg. Chem., 1969, 8, 986.
Chalk, J. Chem. Soc., Chem. Commun., 1970, 847.
Harrod and Smith, J. Am. Chem. Soc., 1970, 92, 2699.
Seki, Hidaka, Murai and Sonoda, Angew. Chem., 1977, 89, 196.
Murai and Sonoda, Agnew. Chem., Int. Ed., 1979, 18, 837.
Ungvary and Marko, J. Organometal. Chem., 1981, 219, 397.
Ungvary and Marko, Organometallics, 1982, 1, 1120.
Murai, Hatayama, Murai and Sonoda, Organometallics, 1983, 2, 1883.

(List continued on next page.)

*Primary Examiner*—John C. Bleutge
*Assistant Examiner*—Margaret W. Glass

[57] ABSTRACT

A catalyst mixture for ring-opening polymerization of heterocyclic monomers and polymers includes a catalyst composed of a cobalt carbonyl complex; and a cocatalyst composed of at least one Si-H-containing compound. A curable composition, which may be a two-part kit, is also disclosed and includes the catalyst; the cocatalyst; and at least one polymerizable compound which is a monomer or polymer containing a heterocyclic ring. A method of producing a polymeric product by ring-opening polymerization of heterocyclic monomers and polymers is also disclosed which includes the steps of preparing a mixture including a catalyst composed of a cobalt carbonyl complex, a cocatalyst composed of at least one Si-H-containing compound, and at least one polymerizable compound which is a monomer or polymer containing a heterocyclic ring; and reacting the mixture, preferably at about room temperature, to promote ring-opening polymerization of the at least one polymerizable compound to produce the polymeric product.

8 Claims, No Drawings

OTHER PUBLICATIONS

Alper, Arzoumanian, Petrinani and Saldana-Maldonado, J. Chem. Soc., Chem. Commun., 1985, 340.
Kang and Weber, Tetrahedron Letters, 1985, 26, 5415.
Kang and Weber, Tetrahedron Letters, 1985, 26, 5753.
Murai, Kato, Murai, Hatayama and Sonoda, Tetrahedron Letters, 1985, 26, 2683.
Chatani, Fujii, Yamasaki, Murai and Sonoda, J. Am. Chem. Soc., 1986, 108, 7361.
Hilal, Abu-Eid, Al-Subu and Khalaf, J. Molecular Catalysis, 1987, 39, 1.
Alper and Calet, Tetrahedron Letters, 1988, 29, 1763.
Major, Horvath, and Pino, J. Molecular Catalysis, 1988, 45, 275.
Murai et al., J. Am. Chem. Soc., 1989, 111, 7938.
Wang, Calet and Alper, J. Organ. Chem., 1989, 54, 20.
*Group IV-Cobalt Complexes as Catalyst for Silylation and Cyclic Ether Polymerization*, Chalk Chemical Communications, 1970, pp. 847, 848.

COBALT CATALYST FOR RING-OPENING POLYMERIZATION OF EXOPIDES AND OTHER HETEROCYCLES

This is a continuation of application Ser. No. 07/934,584 filed on Aug. 24, 1992, now abandoned.

TECHNICAL FIELD

The present invention relates to a cobalt-based catalyst which promotes ring-opening polymerization (ROP), preferably at room temperature, of a wide variety of heterocyclic ring-containing monomers and polymers, particularly epoxide-ring containing monomers and polymers. The invention also relates to a curable composition containing the catalyst and heterocyclic monomers or polymers, as well as to a method of making a polymeric product by ring-opening polymerization of heterocycles.

BACKGROUND ART

Dicobaltoctacarbonyl, $Co_2(CO)_8$, has been widely used as a catalyst for the hydrogenation of olefins, for which reference is made to (a) Major, Horvath, and Pino, *J. Molecular Catalysis*, 1988, 45, 275, (b) Ungvary and Marko, *J. Organometal. Chem.*, 1981, 219, 397, (c) Ungvary and Marko, *Organometallics*, 1982, 1, 1120, and (d) Wender, Levine and Orchin, *J. Am. Chem. Soc.*, 1950, 72, 4375); the hydroformylation of olefins, for which reference is made to (a) Wender, Sternberg and Orchin, *J. Am. Chem. Soc.*, 1953, 75, 3041, and (b) Orchin, Kirch and Goldfarb, *J. Am. Chem. Soc.*, 1956, 78, 5450; and the hydrosilation of olefins, for which reference is made to (a) Hilal, Abu-Eid, Al-Subu and Khalaf, *J. Molecular Catalysis*, 1987, 39, 1, (b) Harrod and Chalk, *J. Am. Chem. Soc.*, 1965, 87, 1133, (c) Chalk and Harrod, *J. Am. Chem. Soc.*, 1965, 87, 1133, (d) Chalk and Harrod, *J. Am. Chem. Soc.*, 1967, 89, 1640, and (e) Baay and MacDiarmid, *Inorg. Chem.*, 1969, 8, 986. In addition, there is one report in the literature describing the catalysis by $Co_2(CO)_8$ of the ring-opening polymerization of a heterocyclic compound (Chalk, *J. Chem. Soc., Chem. Commun.*, 1970, 847). Chalk has reported that when $Co_2(CO)_8$ was used as a hydrosilation catalyst employing tetrahydrofuran as a solvent, poly(tetramethylene oxide) resulting from the ring-opening of THF was isolated. A cationic mechanism was proposed as depicted in equation 1 which follows.

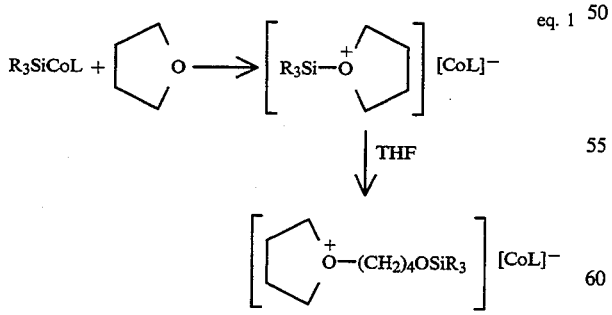

Harrod and Smith similarly observed that THF could be ring-opened under hydrosilation conditions using iridium-containing catalysts (Harrod and Smith, *J. Am. Chem. Soc.*, 1970, 92, 2699). However, polymerization was not observed and only the olefin shown in equation 2, which follows, derived from transfer of the trialkylsilyl group to the oxygen of THF followed by ring opening and elimination, was obtained.

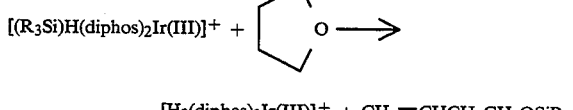

In addition, $Co_2(CO)_8$-mediated ring-opening reactions of carbon monoxide with epoxides and other heterocyclic compounds has recently been studied, regarding which reference is made to (a) Alper, Arzoumanian, Petrinani and Saldana-Maldonado, 1985, *J. Chem. Soc., Chem. Commun.*, 1985, 340, (b) Alper and Calet, *Tetrahedron Letters*, 1988, 29, 1763, (c) Wang, Calet and Alper, *J. Organ. Chem*, 1989, 54, 20, (d) Kang and Weber, *Tetrahedron Letters*, 1985, 26, 5415, (e) Kang and Weber, *Tetrahedron Letters*, 1985, 26, 5753, (f) Seki, Hidaka, Murai and Sonoda, *Angew, Chem.*, 1977, 89, 196, (g) Murai and Sonoda, *Angew. Chem.*, Int. Ed., 1979, 18, 837, (h) Murai, Hatayama, Murai and Sonoda, *Organometallics*, 1983, 2, 1883, (i) Chatani, Fujii, Yamasaki, Murai and Sonoda, *J. Am. Chem. Soc.*, 1986, 108, 7361, (j) Murai, Kato, Murai, Hatayama and Sonoda, *Tetrahedron Letters*, 1985, 26, 2683, and (k) Murai et al., *J. Am. Chem. Soc.*, 1989, 111, 7938). These reactions require high pressure and high temperatures, and polymerization was not observed in any of these studies. Two examples of these reactions are given in equations 3 and 4 which follow.

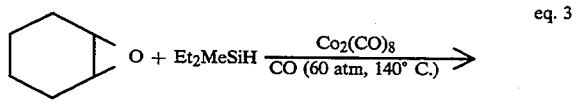

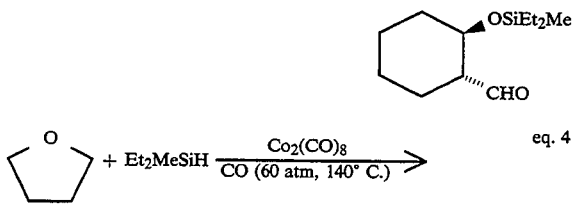

Although the prior art includes these few isolated examples of ring-opening reactions of oxygen heterocycles by cobalt octacarbonyl, there appear to be no citations in the literature describing the ring-opening polymerization of oxygen heterocycles, such as epoxides or vinyl ether monomers, by this catalyst.

It is thus an object of the present invention to provide a catalyst mixture for ring-opening polymerization of heterocyclic monomers and polymers which is economical and permits the facile polymerization of these monomers and polymers preferably at room temperature.

It is another object of the present invention to provide a curable composition, which may be a two part kit, including the catalyst mixture for ring-opening polymerization of heterocyclic monomers and polymers, and at least one polymerizable compound which is a monomer or polymer containing a heterocyclic ring including oxygen, nitrogen, or sulfur.

It is still another object of the present invention to provide a method of making a polymeric product by ring-opening polymerization of heterocyclic monomers and polymers, including monomers and polymers of oxygen, nitrogen, and sulfur heterocycles, such as oxygen heterocycles including epoxides and vinyl ether monomers, preferably at about room temperature.

DISCLOSURE OF THE INVENTION

The present invention therefore provides a catalyst mixture for ring-opening polymerization of heterocyclic monomers and polymers, which catalyst mixture includes a catalyst comprised of a cobalt carbonyl complex; and a cocatalyst comprised of at least one Si-H-containing compound. Preferably, the cobalt carbonyl complex is selected from the group consisting of $Co_2(CO)_8$ and $Co_4(CO)_{12}$. Most preferably the cobalt carbonyl complex is $Co_2(CO)_8$.

Further, the present invention provides a curable composition including a catalyst comprised of a cobalt carbonyl complex; a cocatalyst comprised of at least one Si-H-containing compound; and at least one polymerizable compound which is at least one monomer or polymer containing a heterocyclic ring. The curable composition may be a kit having first and second parts, the first part comprising the catalyst and a portion of the at least one polymerizable compound, and the second part comprising the cocatalyst and a remaining portion of the at least one polymerizable compound.

Finally the present invention provides a method of making a polymeric product by ring-opening polymerization of heterocyclic monomers and polymers including the steps of preparing a mixture comprised of a catalyst comprised of a cobalt carbonyl complex; a cocatalyst comprised of at least one Si-H-containing compound; and at least one polymerizable compound which is a monomer or polymer containing at least one heterocyclic ring; and reacting the mixture at a temperature effective to promote ring-opening polymerization of the at least one compound to produce a polymeric product, preferably at about room temperature.

BEST MODE FOR CARRYING OUT THE INVENTION

Surprisingly, it was discovered that $Co_2(CO)_8$, when combined with an Si-H-containing cocatalyst, is a very efficient catalyst for the ring-opening polymerization of epoxides, vinyl ether monomers, and other heterocyclic compounds. The reaction conditions employed are very similar to those reported in the foregoing for hydrosilation reactions, the disclosures of which are incorporated herein by reference. Polymerization of epoxides has been found, in many cases, to proceed rapidly and very exothermically at room temperature, and has a generalized reaction given by equation 5.

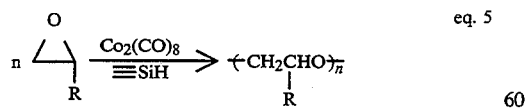

eq. 5

A wide variety of monomers and polymers of oxygen, nitrogen and sulfur heterocycles having 3-,4-,5-and 7-membered rings can be polymerized using this novel catalyst/cocatalyst mixture. Thus, while the descriptions and examples which follow focus on oxygen heterocycles and, in particular, epoxides and vinyl ethers, the inventors believe that ring-opening polymerization employing the novel catalyst/cocatalyst mixture according to the invention is possible for a wide variety of oxygen, nitrogen, and sulfur heterocycles having 3-,4-,5- and 7-membered rings.

For example, a wide variety of epoxide-containing monomers can be polymerized using these novel catalyst mixtures. These include cycloaliphatic and aliphatic epoxides, epoxidized oils and glycidyl ethers. Some of the many examples of such monomers are shown below and include all of the major structural types.

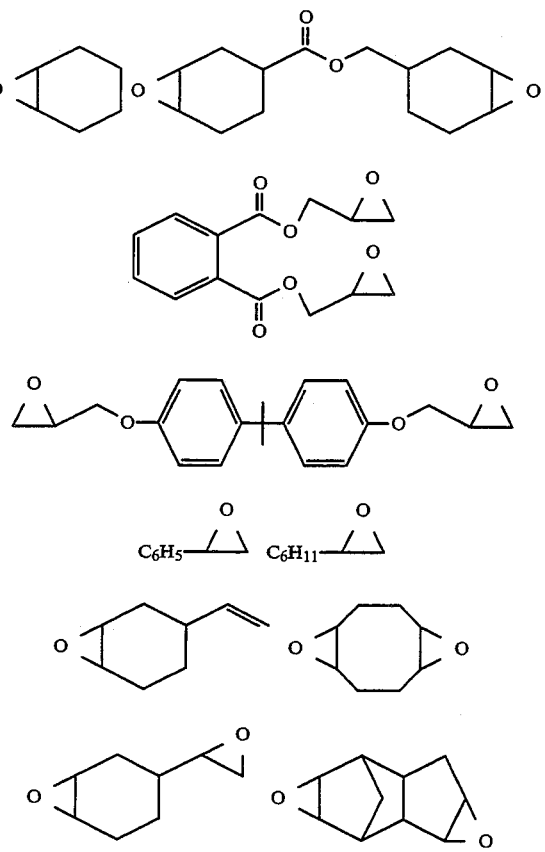

In addition to the examples shown above, epoxidized polymers, such as epoxidized butadiene and poly(glycidylmethacrylate) can also be polymerized using this new initiator system. Further, terminal epoxy functional oligomers, such as bisphenol-A extended glycidyl epoxides and novolac epoxides can similarly be polymerized.

Further, the ring-opening polymerization of other oxygen heterocycles can also be carried out using the above described cobalt catalysts/Si-H-containing cocatalysts. For example, both oxetane and 3,3-bis-chloromethyloxetane were successfully polymerized by ring-opening. A typical vinyl ether monomer, i-propyl vinyl ether also underwent facile, exothermic polymerization. Examples of these and other polymerizations follow in the experimental portion. Preferably, however, the at least one monomer or polymer is selected from the group consisting of an epoxide, an oxetane, a cyclic ether, a lactone, and a cyclic amine.

The optimal cobalt-containing catalyst is a cobalt carbonyl catalyst, most particularly dicobalt octacarbonyl $Co_2(CO)_8$. This is the least expensive and most readily available active catalyst. Other cobalt carbonyl complexes, for example, $Co_4(CO)_{12}$, appear to function as catalysts and would be useful in the practice of the present invention, but are less active and/or stable than $Co_2(CO)_8$ and less practical.

Ring-opening polymerization according to the invention can be induced in two modes. For example, an epoxide monomer or polymer, a cobalt carbonyl complex catalyst, and an Si-H-containing cocatalyst can be simply mixed together at the same time, whereupon polymerization ensues after an induction period of a few seconds. Alternatively, the catalyst and cocatalyst may be mixed together first and then added to the epoxy monomer or polymer. In this later case, polymerization often takes place without an appreciable induction period. Thus, if a curable composition which is a kit having first and second parts is to be produced, the first part includes the catalyst and a portion of the polymerizable compound(s), and the second part includes the cocatalyst and the remaining portion of the polymerizable compound(s). This minimizes the chance of premature reaction and extends the shelf life of the kit.

Preferably the reaction proceeds at room temperature, but gentle warming to, for example 60° C. may facilitate some reactions. Indeed, some reactions might required heating to a temperature of at least about 150° C.

The catalyst mixture may contain from about 0.5 to about 10,000 ppm by weight of the cobalt carbonyl complex and from about 1 to about 20,000 ppm by weight of the at least one Si-H-containing compound based on 100 parts by weight total weight of a curable composition containing same. The curable composition may contain from about 0.5 to about 10,000 ppm by weight of the cobalt carbonyl complex, from about 1 to about 20,000 ppm by weight of the at least one Si-H-containing compound, and from about 0.5 to about 100 parts by weight of the at least one polymerizable compound. Preferably, from about 1 to about 100 parts by weight, most preferably, from about 5 to about 100 parts by weight of the at least one polymerizable compound are employed.

When the curable composition contains less than about 100 parts by weight of the at least one polymerizable compound, such as, for example, 90 parts by weight thereof, the balance, after the catalyst and cocatalyst, may comprise fillers, extenders, reinforcing fibers, pigments, metal powders, and solvents, as well as other such materials as is known in the art. Preferably the balance includes fillers. When solvents are employed, they may be selected from among any suitable solvent or solvent system, for example, hydrocarbon solvents, such as hexane, octane, xylene, and toluene, may be used.

Preferably the catalyst and cocatalyst are kept apart until the time is appropriate to conduct the ring-opening polymerization. Solvent carriers may be employed for the catalyst and cocatalyst to facilitate measured additions thereof in view of the small quantities of these materials used in the curable compositions. Suitable solvents include hydrocarbons, for example, hexane, octane, xylene, and toluene and, preferably, toluene is employed.

The curable compositions including the catalyst mixtures of a cobalt catalyst and cocatalyst described in this disclosure have many potential applications. For example, they may be used as two component adhesives for metal, glass, wood or plastics. They may be used in molding and encapsulation and insulation for electronic components. In addition, they may also be employed together with a wide assortment of fillers, pigments and additives for resin transfer molding or for liquid injection molding or reaction injection molding. These latter fabrication techniques are employed for the molding of large parts and for the construction of composites. When spread as films onto surfaces, they may also serve as protective and decorative coatings.

The range of Si-H-containing compounds which can be used as cocatalysts in the course of the ring opening polymerization reaction is very broad and includes virtually any compound containing this moiety. Some of these include: monoalkyl and monoaryl silanes, such as n-butylsilane, n-hexylsilane, phenylsilane, n-octadecylsilane, cyclohexylsilane, tolylsilane, n-docecylsilane, and i-butylsilane; dialkyl, alkylaryl and diarylsilanes, such as diethylsilane, di-n-hexylsilane, di-n-butylsilane, methyl-n-butylsilane, phenylmethylsilane, and diphenylsilane; trialkyl, dialkylaryl, alkyldiaryl and triarylsilanes, such as tri-n-butylsilane, tri-n-hexylsilane, triethylsilane, trimethylsilane, diphenylmethylsilane, and dimethylphenylsilane; cyclic siloxanes, such as 1,3,5,7,-tetramethylcyclotetrasiloxane, and 1,3,3,5,7,7-hexamethylcyclotetrasiloxane; miscellaneous silanes, such as triethoxysilane, 1,1,3,3-tetramethyldisiloxane, trichlorosilane, dichloromethylsilane, and tetramethyldisilane; and polymeric silanes, such as poly(methylhydrogen siloxane).

Preferably that at least one Si-H-containing compound is selected from the group consisting of monoalkyl silanes, monoaryl silanes, dialkyl silanes, alkylaryl silanes, diarylsilanes, trialkyl silanes, dialkylaryl silanes, alkyldiaryl silanes, triarylsilanes, cyclic silanes, and polymeric silanes.

Further, it is possible to utilize the inventive catalyst mixture to simultaneously catalyze both hydrosilation and ring-opening polymerization. A series of unique network polymerizations can result when this concept is used. For example, when a vinyl-containing epoxide, such as 4-vinyl-cyclohexene oxide, was reacted with n-butylsilane in the presence of $Co_2(CO)_8$, polymerization proceeded very fast and a crosslinked polymer is obtained within a few seconds at room temperature.

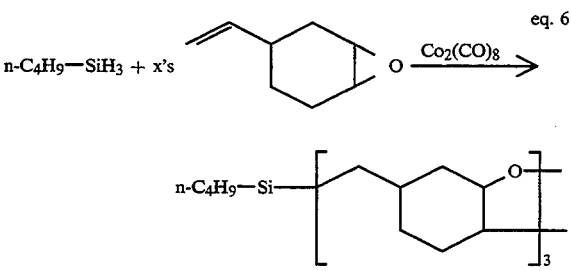

eq. 6

Similarly, other vinyl epoxides can be employed together with multifunctional Si-H compounds to prepare network polymers with a variety of interesting mechanical and chemical properties. For example, reaction of vinyl epoxides with silicones containing Si-H groups in the presence of the cobalt catalysts of this invention would afford elastomeric silicone networks. Such materials would be expected to have either adhesive or abhesive properties depending on their structure. Silicones having abhesive properties are useful as paper release agents.

The following examples are offered by way of illustration of this invention and are not intended to indicate its limitations.

EXAMPLE 1: General Procedures for Ring-Opening Polymerizations.

The following examples include typical procedures which may be used for the polymerization of various monomers.

EXAMPLE 2: Bulk Polymerization of Cyclohexene Oxide.

In a small vial, 1.0 g (0.010 mol) cyclohexene oxide was mixed with 2-5 drops of n-BuSiH$_3$ and then a trace amount (1-2 mg) of Co$_2$(CO)$_8$ catalyst was added. Very rapid, exothermic polymerization took place after an induction period of a few seconds resulting in the isolation of solid poly-(cyclohexene oxide). The polymerization was terminated by the addition of a few drops of triethylamine and the polymer dissolved in chloroform. Gas chromatographic analysis for residual cyclohexene oxide monomer showed that the conversion to polymer was 95%. Gel permeation chromatography of the polymer gave a M$_n$=9600 g/mol, a M$_w$=19,100 g/mol with a dispersity of 1.99.

Similarly, 15 mg (4.5×10$^{-5}$ mol) of Co$_2$(CO)$_8$ was dissolved in 10.0 g (0.10 mol) cyclohexene oxide to give a yellow-brown solution. To this solution there were added 0.5 g (5.68×10$^{-3}$ mol) n-butylsilane at room temperature. Polymerization took place very rapidly and exothermically resulting in a brown colored solid polymer. The polymer was dissolved in CHCl$_3$ and precipitated into methanol. This process was repeated three more times and then the polymer was dried in a vacuum oven prior to submission for $^{13}$C and $^{29}$Si NMR analysis. These analyses confirmed the structure of the polymer to be poly(cyclohexene oxide).

EXAMPLE 3: Polymerization of Oxetane.

There were dissolved 5 mg (1.46×10$^{-5}$ mol) of Co$_2$(CO)$_8$ in 1.0 g (0.010 mol) cyclohexene oxide to give a yellow-brown solution. To this solution there were added at room temperature 40.0 μL (3.5×10$^{-4}$ mol) n-BuSiH$_3$ resulting in rapid, exothermic polymerization after a 2-3 second induction period. A viscous liquid polymer was obtained after standing for 12 hours at room temperature which was dissolved in CHCl$_3$ and analyzed by GPC. The polymer was found to have a M$_n$ of 31,500 g/mol and a M$_w$ of 67,200 g/mol with a dispersity of 2.13.

EXAMPLE 4: Solution Polymerization of Cyclohexene Oxide.

Cyclohexene oxide (1.00 g, 0.010 mol) was mixed with 2.00 mL dry toluene in a small vial. To the above solution, 2 mg (5.86×10$^{-6}$ mol) of Co$_2$(CO)$_8$ and 40.0 μL (3.5×10$^{-4}$ mol) n-BuSiH$_3$ were introduced, polymerization took place after a brief induction period as indicated by the temperature change of the polymerization vessel. The polymer was isolated by addition of methanol to the reaction mixture followed by filtration of the precipitated polymer.

EXAMPLE 5: Polymerization of Isopropyl Vinyl Ether.

To 1.0 g (0.012 mol) isopropyl vinyl ether there were added 5 mg (1.46×10$^{-5}$ mol) of Co$_2$(CO)$_8$ resulting in the formation of a yellow-brown solution. To this solution there were added 40 μL (3.5×10$^{-7}$ mol) of n-butylsilane whereupon polymerization took place rapidly and exothermically. The reaction mixture was allowed to stand for two days and then a portion of the polymer solution was dissolved in CHCl$_3$ and analyzed by GPC. The polymer had a M$_n$=1,950 g/mol, M$_w$=3,220 g/mol and a dispersity of 1.65.

The above reaction was repeated using diethylene glycol divinyl ether. Rapid polymerization was observed with formation of a crosslinked, insoluble resin.

EXAMPLE 6: Ring-Opening Polymerization Using a Preformed Catalyst.

To 5 mg (1.46×10$^{-5}$ mol) of Co$_2$(CO)$_8$ in a small reaction vessel there were added 0.1 mL (8.5×10$^{-4}$ mol) of n-butylsilane at room temperature. The reaction was very rapid and gas evolution was observed. The brown solution which resulted was then added to 2.0 g (0.020 mol) of cyclohexene oxide monomer and very rapid, exothermic polymerization occurred immediately on mixing. The final polymer was isolated by precipitation into methanol followed by decantation of the methanolic top layer from the semi-solid polymer. The polymer was further washed with methanol and dried in a vacuum oven.

EXAMPLE 7: Polymerization of Cyclohexene Oxide Using Co$_4$(CO)$_{12}$.

A solution prepared by mixing 5.0 mg Co$_4$(CO)$_{12}$, 1.0 g of cyclohexene oxide and 0.1 mL of n-butylsilane was allowed to stand at room temperature for 16 hr. Polymerization proceeded slowly under these conditions with no observable evolution of heat to give a very viscous polymer solution.

EXAMPLE 8: Crosslinking Polymerizatin of Diepoxides.

To 2.0 g (7.94×10$^{-3}$ mol) of 3,4-epoxycyclohexyl-methyl-3,4'-epoxycyclohexane carboxylate there were added 2 mg (5.86×10$^{-6}$ mol) of Co$_2$(CO)$_8$. To the resulting yellow solution there were added 40 μL (3.5×10$^{-7}$ mol) of n-butylsilane and the reaction mixture vigorously stirred. Rapid polymerization took place accompanied by hydrogen evolution with the formation of a solid, foamed polymer. The resulting crosslinked polymer was insoluble in CHCl$_3$.

A similar polymerization was carried out replacing the above diepoxide with 2.0 g (5.28×10$^{-3}$ mol) of 1,3-bis[2-(3-(7-oxabicyclo[4.1.0]-heptyl)ethyl]tetramethyldisiloxane. In this case, very vigorous polymerization was accompanied by considerable gas evolution and partial thermal decomposition of the polymer.

EXAMPLE 9: Simultaneous Hydrosilation and Ring-Opening Polymerization.

Combined in a small flask were 1.2 g (9.68×10$^{-3}$ mol) of 4-vinylcyclohexene oxide and 0.88 g (0.01 mol) of n-butylsilane. To the solution 3 mg (8.77×10$^{-6}$ mol) of Co$_2$(CO)$_8$ were added and mixed. The solution turned yellow and polymerization took place after a 2 second induction period. The mixture became progressively more viscous until geleation occurred. The final polymer was a crosslinked, insoluble solid.

The above experiment was repeated in 1.0 ml of toluene solvent. No gelation was observed. However, GPC analyses of the final polymer showed that both hydrosilation and polymerization had occurred (M$_n$=29,000 g/mol, M$_w$/M$_n$=2.9).

In a similar fashion, vinylcyclohexene oxide was polymerized in 2.0 mL toluene solvent. In this case, both hydrosilation and polymerization had occurred ($M_n=23,000$ g/mol, $M_w/M_n=1.8$).

EXAMPLE 10: Polymerization Using Poly(methylhydrogen)siloxane as a Cocatalyst.

Cyclohexene oxide, 10.0 g (0.102 mol) and 3.0 g of poly(methylhydrogen)siloxane ($M_n=4,300$ g/mol) were mixed at room temperature. To the resulting solution there were added 10.0 mg ($2.93\times10^{-5}$ mol) of $Co_2(CO)_8$. Initially, a yellow solution was formed, which rapidly became brown. The color change was accompanied by rapid polymerization. The rubbery polymer which was obtained was partially cross-linked.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method of making a polymeric product by ring-opening polymerization of heterocyclic monomers and polymers, comprising:
   (i) preparing a mixture comprised of:
      (a) a catalyst comprised of a cobalt carbonyl complex;
      (b) a cocatalyst comprised of at least on Si-H-containing compound; and
      (c) at least one polymerizable compound which is a monomer or polymer containing at least one heterocyclic ring, wherein said polymerizable compound is selected from a group consisting of epoxidized oil, glycidyl ethers, epoxidized butadiene, poly(glycidylmethacryiate), bisphenol-A extended glycidyl epoxides, novolac epoxides, oxetane, and 3,3-bischloromethyloxetane; and
   (ii) reacting the mixture at a temperature effective to promote ring-opening polymerization of the least one compound to produce a polymeric product.

2. The method according to claim 1, wherein the mixture is prepared by simultaneously admixing the catalyst, the cocatalyst and the at least one compound.

3. The method according to claim 1, wherein the mixture is prepared by first admixing the catalyst and the cocatalyst to provide a catalyst mixture, and then admixing the catalyst mixture and the at least one compound.

4. The method according to claim 1, wherein the mixture is reacted at about room temperature.

5. The method according to claim 1, wherein the cobalt carbonyl complex is selected from the group consisting of $Co_2(CO)_8$ and $Co_4(CO)_{12}$.

6. The method according to claim 5, wherein the cobalt carbonyl complex is $Co_2(CO)_8$.

7. The method according to claim 1, wherein the at least one Si-H-containing compound is selected from the group consisting of monoalkyl silanes, monoaryl silanes, dialkyl silanes, alkylaryl silanes, diarylsilanes, trialkyl silanes, dialkylaryl silanes, alkyldiaryl silanes, triarylsilanes, cyclic silanes, and polymeric silanes.

8. The method according to claim 1, wherein the mixture contains from about 0.5 to about 10,000 ppm by weight of the cobalt carbonyl complex, from about 1 to about 20,000 ppm by weight of the at least 1 Si-H-containing compound, and from 0.5 to about 100 parts by weight of the at least one polymerizable compound, each of which is based on 100 parts weight total weight of a curable composition containing same.

* * * * *